Jan. 15, 1957  J. J. ZOETEMELK  2,777,196
DOUBLE PURPOSE GRASS SHEARS
Filed June 25, 1956
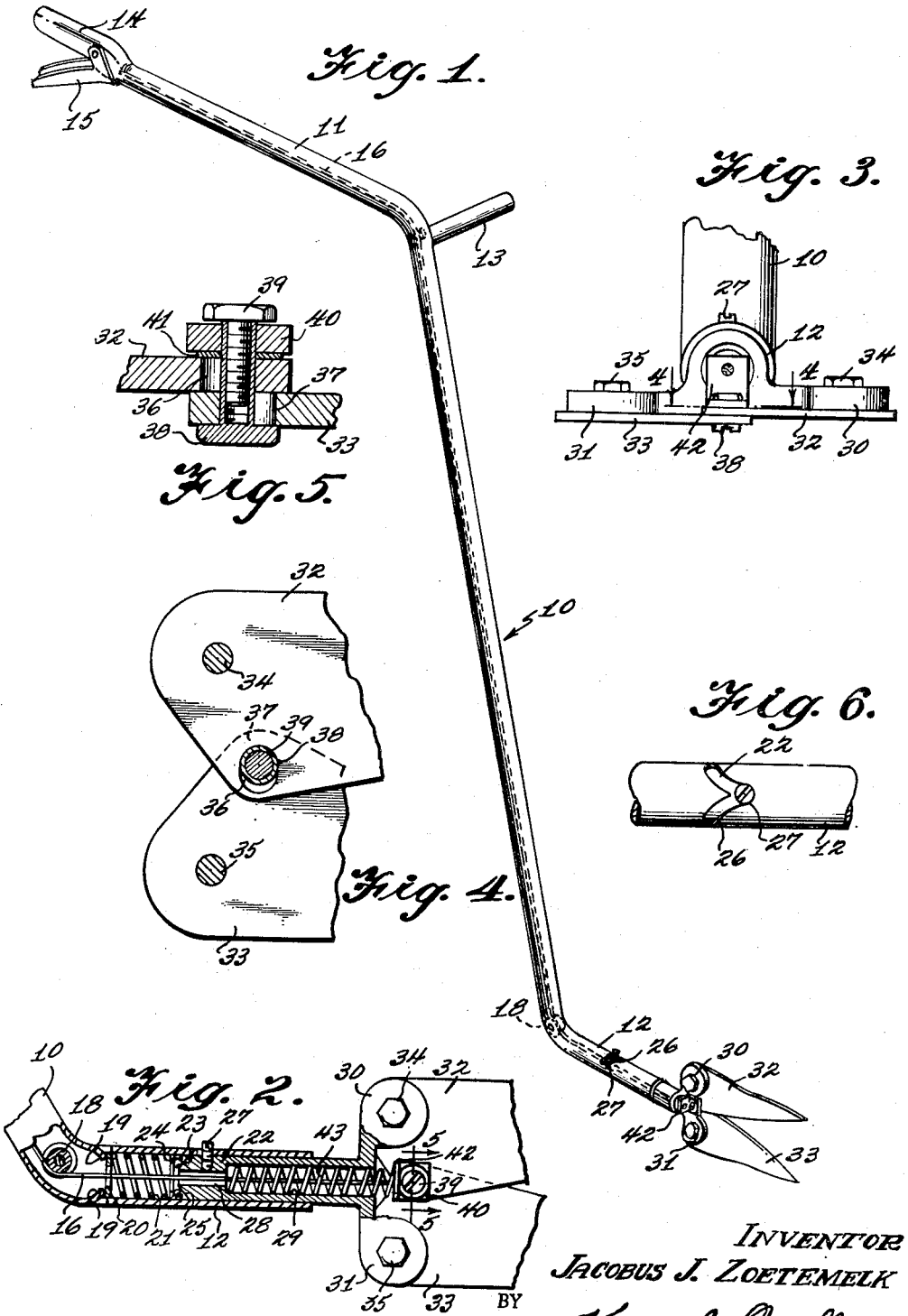
INVENTOR
JACOBUS J. ZOETEMELK
BY Kimmel & Crowell
ATTORNEYS

United States Patent Office 2,777,196
Patented Jan. 15, 1957

2,777,196

DOUBLE PURPOSE GRASS SHEARS

Jacobus J. Zoetemelk, Toronto, Ontario, Canada

Application June 25, 1956, Serial No. 593,727

5 Claims. (Cl. 30—248)

The present invention relates to double purpose grass shears, and more particularly to grass shears which can be adjusted for use with the blades in a horizontal or a vertical plane.

The primary object of the invention is to provide adjustable double purpose grass shears which can be adjusted by use of the shear actuating grip.

Another object of the invention is to provide a double grass shear which can be operated from an erect position.

A further object of the invention is to provide a double purpose shear which is inexpensive to manufacture, simple to use, and completely effective in its action.

Other objects and advantages will become apparent in the following specifications when considered in the light of the attached drawings, in which:

Figure 1 is a perspective view of the invention showing the grass shears in vertical alignment.

Figure 2 is an enlarged fragmentary longitudinal cross-section of the device showing the shears in vertical cutting position.

Figure 3 is an enlarged fragmentary front elevation of the invention.

Figure 4 is an enlarged fragmentary horizontal cross-section along the line 4—4 of Figure 3, looking in the direction of the arrows.

Figure 5 is an enlarged fragmentary transverse cross-section taken along the line 5—5 of Figure 2, looking in the direction of the arrows.

Figure 6 is a fragmentary plan view showing the blade camming slot and screw.

Referring now to the drawings in detail wherein like reference characters indicate like parts throughout the several figures, the reference numeral 10 indicates generally a tubular handle having an integral offset upward extension 11 and an integral offset lower extension 12 extending oppositely of but parallel to the extension 11.

A laterally extending handle 13 is carried by the tubular handle 10 adjacent the juncture of the tubular handle 10 with the offset extension 11. The rear terminal end of the offset extension 11 has the upper portion thereof formed into a handle grip member 14 with a pivoted grip handle 15 secured thereto for pivotal action with relation to the offset extension 11.

A cable 16 is secured to the pivoted handle 15 and extends through the tubular offset extension 11 over a pulley journalled within the tubular handle 10 at the point of the juncture thereof with the tubular extension 11. The cable 16 extends downwardly through the tubular handle portion 10 and under a pulley 18 journalled at the juncture of the tubular handle 10 with the lower offset extension 12.

The lower offset extension 12 is provided with a plurality of lugs 19 struck therefrom to extend into the tubular extension 12. A washer 20 engages about the cable 16 and against the lugs 19 to form an inner stop within the offset extension 12. A coil spring 21 is positioned within the offset extension 12 and has the inner end thereof engaging against the washer 20.

A body 22 having a cylindrical cross-section is positioned within the tubular extension 12 and has a conical rear end portion 23 positioned adjacent the spring 21. A bearing retainer 24 is positioned between the body 22 and the spring 21 retaining bearing balls 25 against the conical surface 23 so as to provide a seat for the outer end of the spring 21 to bear against the body 22. A V-shaped slot 26 extends through the tubular extension 12 of the handle 10, as best seen in Figure 6.

A guide pin 27 extends upwardly through the slot 26 and is embedded by any suitable means in the body 22.

The body 22 has a bore 28 extending therethrough and a somewhat larger bore 29 extends into the body 22 from its opposite end communicating with the bore 28. Offset bosses 30 and 31 are cast integrally with the body 22 and extend laterally therefrom. A pair of oppositely shaped blades 32 and 33 are pivoted to the bosses 30 and 31 by means of pivot pins 34 and 35, respectively.

The blade 32 is provided with an elongated slot 36 overlying an elongated slot 37 in the blade 33. A threaded retainer member 38 extends through the aligned elongated slots 36 and 37 and is secured therein by means of a stud bolt 39.

An angle iron connector 40 is positioned over the threaded securing member 38 and separated from the blade 32 by means of a washer 41. The angle iron connector 40 has an upstanding flange portion 42 which is aligned with the bores 28 and 29 of the body 22, as illustrated in Figure 3.

A coil spring 43 is positioned within the bore 29 bearing against the inner end of the bore 29 at one end, and against the flange 42 of the connector 40 at the other end. The cable 16 extends through the bore 28, the bore 29, the spring 43, and through the upstanding flange 42 of the connector 40 to which it is secured by any suitable means.

In the use and operation of the invention, the blades are positioned as illustrated in Figure 3, so as to be horizontal to the ground surface. In this position of the blades 32 and 33, when the hand grips 14 and 15 are drawn toward each other, the blades 32 and 33 will be caused to close in a shearing action, cutting the grass along the edges of the mowed lawn.

When it is desired to change the blades 32 and 33 to the vertical position illustrated in Figure 1, for trimming along the edges of flower borders and the like, the hand grips 14 and 15 are brought completely together, pulling the body 22 rearwardly in the tubular extension 12 against tension of the spring 21 so that the guide pin 27 is moved within the V-shaped slot 26 to the apex of the V-shaped slot 26.

The handles 14 and 15 are then released while maintaining the slight side pressure on the blades 32 and 33 in the direction that it is desired to move them so that the guide pin 27 will move into the other side of the V-shaped slot 26 aligning the blades 32 and 33 in a vertical position, as illustrated in Figure 1.

Shearing action of the blades 32 and 33 is carried on by the handles 14 and 15 in the same manner for the vertical aligned position of the blades 32 and 33 as was used in the horizontal aligned position thereof.

Having thus described the preferred embodiment of the invention, it should be understood that numerous structural modifications and adaptations may be resorted to without departing from the scope of the appended claims.

What is claimed is:

1. A double purpose grass shear comprising a tubular handle member having upper and lower oppositely extending offset portions, a hand grip formed on the terminal end of the upper offset portion, a handle pivotally carried by said hand grip, a body slidably and pivotally mounted in the lower offset extension on said handle, means biasing said body toward the open end of said offset extension, a lateral head integrally formed on the outer end of said body, a pair of blades pivotally mounted on said head and arranged in shearing relation to each other, a cable secured at one end to said pivotal handle and extending through said tubular handle, and means connecting the opposite end of said cable to said blades for actuating said blades upon movement of said pivoted handle.

2. A double purpose grass shear comprising a tubular handle, a body mounted in said tubular handle for sliding and rotary movement therein, means on said body for pivotally securing shearing blades thereon, means carried by said tubular handle for pivoting said blades on said body, and means on said tubular handle for guiding said body to adjust said blades from a vertical to a horizontal position.

3. A grass shear comprising a tubular handle having a V-shaped slot formed therein, the apex of the slot extending longitudinally of said handle, a body mounted in said tubular handle for sliding and rotary movement therein, means secured to said body and extending through said V-shaped slot for aligning said body with said V-shaped slot, a pair of shearing blades, means on said body pivotally securing said blades thereto, means on said handle for moving said blades about said pivot means to cause a shearing action therebetween, said means being adapted upon additional movement thereof to slide said body in said tubular handle whereby said guide means will move through said V-shaped slot rotating said body to a second position.

4. A device as claimed in claim 3 wherein the means for moving said blades on their pivot means comprises a handle pivotally carried by said tubular handle, and a cable secured to said pivoted handle at one end and to said blades at the other end having the medial portions thereof extending through said tubular handle.

5. A device as claimed in claim 4 wherein means are provided within said tubular handle for biasing said blades to open position, and additional means are provided in said tubular handle for biasing said body outwardly of said tubular handle securing said blades in either of its two adjusted positions.

No references cited.